May 12, 1953 H. H. FINK 2,638,148
SEAT SUSPENSION
Filed July 30, 1947
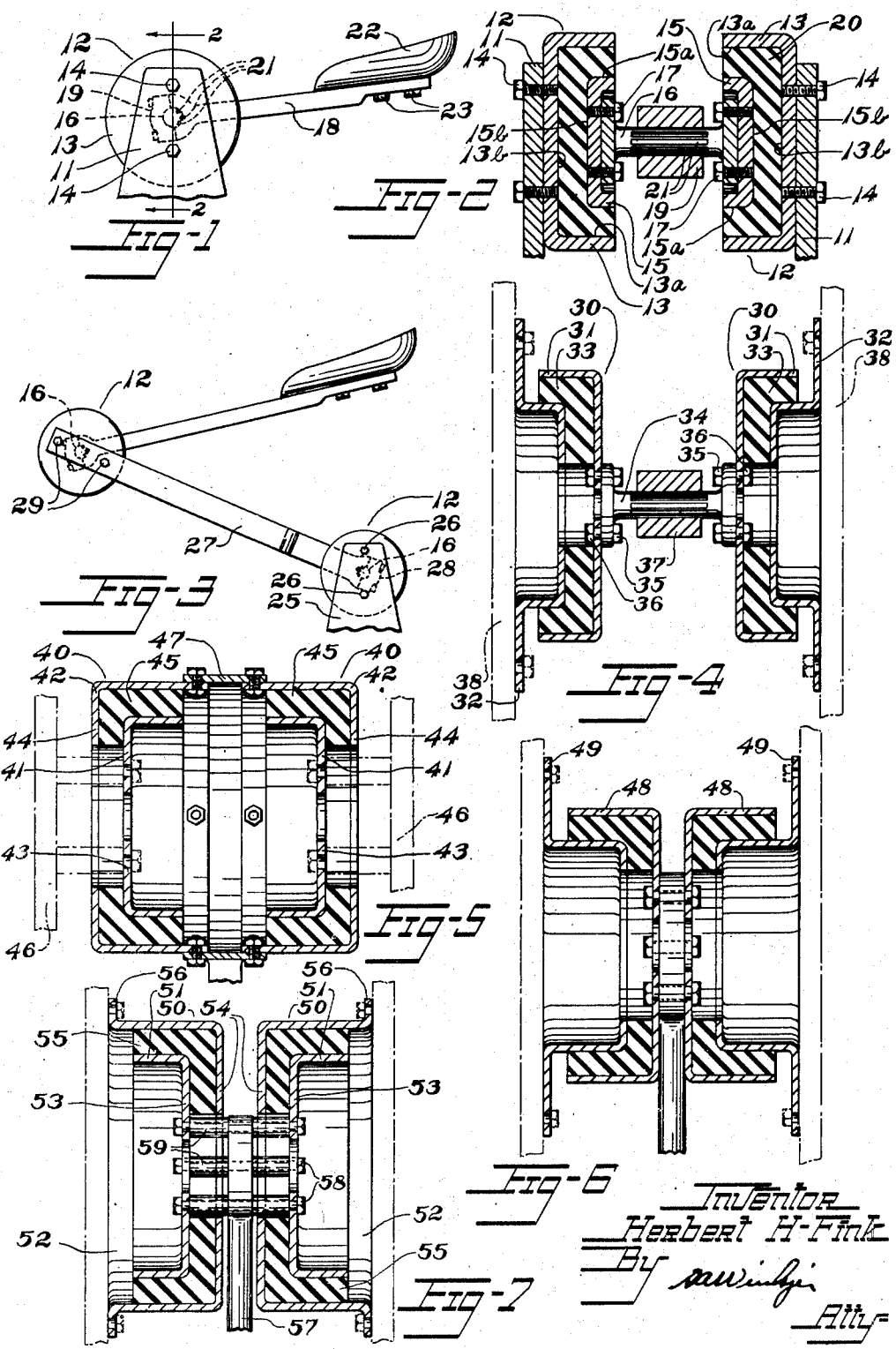
Inventor
Herbert H. Fink Patented May 12, 1953

2,638,148

UNITED STATES PATENT OFFICE 2,638,148

SEAT SUSPENSION

Herbert H. Fink, Akron, Ohio, assignor to The B. F. Goodrich Company, New York, N. Y., a corporation of New York Application July 30, 1947, Serial No. 764,759

3 Claims. (Cl. 155—51)

This invention relates to seat suspensions and especially to those suspensions of the type used for vehicles such as tractors and farm vehicles which are usually not operated on improved roads but on rough ground. Vehicles which operate on unimproved terrain are subjected to tilting and impact forces which vehicles operating on improved roads usually are not exposed to and it is desirable therefore that the seat suspensions used on these vehicles provide cushioning of the riders to reduce the force of the jolts and vibrations which are conducted to the seats and at the same time provide sufficient support to reduce the danger of the riders being thrown from the vehicles by the tilting and devious motions of the vehicles when operated on rough terrain.

It has been found that seat suspensions in which the cushioning is provided by bodies of rubber or other rubber-like material have many desirable features such as no metal-to-metal contact, no lubrication requirements and others. It is an object of the invention to provide a seat suspension which incorporates these desirable features and in addition provides cushioning for a seat in all directions but with greater softness in one direction than in other directions.

Other objects are to provide a spring with soft cushioning circumferentially in torsion and stiff cushioning laterally and axially of the spring, to provide simply and effectively for limiting extreme movements of the parts, and to provide simplicity of construction, ease of installation and maintenance.

These and further objects will be apparent from the following description, reference being had to the accompanying drawings in which:

Fig. 1 is an elevation of a seat suspension constructed in accordance with and embodying the invention.

Fig. 2 is a section taken along line 2—2 of Fig. 1.

Fig. 3 is an elevation of a modified construction.

Fig. 4 is a view like Fig. 2 but of a modified construction.

Fig. 5 is a view like Fig. 2 of a further modification.

Fig. 6 is a view like Fig. 2 of a still further modification.

Fig. 7 is a view like Fig. 2 of a still further modification.

Referring to the drawings, a seat suspension which may be used on farm machinery, tractors and the like type of vehicles is shown in Fig. 1. Brackets 11, 11 which may be mounted on a supporting structure such as a vehicle frame embrace torsion springs 12, 12 as shown in Fig. 2. Each torsion spring 12 comprises outer, dished, concave members 13, 13 which are secured to brackets 11, 11 by suitable means such as screws 14, 14 and inner members 15, 15 which may be disposed between and within the concavities of the outer members 13, 13 in nested relation. The outer and inner members 13 and 15 are relatively rotatable and both may be annular with opposing surfaces 13a and 13a extending axially and opposing surfaces 15b and 13b extending radially of the spring axes. Between and on the inner and outer members 15 and 13 bodies of resilient rubber or other rubber-like material 20, 20 are secured as by a bond of vulcanization for providing resilient resistance to relative movement of the members.

A flanged shaft 16 is disposed between the inner members 15, 15 and is connected thereto as by screws 17, 17. A seat structure is mounted on the shaft 16 and may comprise a cantilever arm member 18 which has a split collar 19 at one end adapted for clamping around the shaft. Key seats 21, 21 are provided in the shaft 16 and collar 19 and keys therein prevent relative rotation of the cantilever arm member 18 and the shaft. A seat 22 is mounted on the cantilever arm 18 at a position outwardly from the shaft 16 by bolts 23, 23.

In operation, upon relative displacement of the seat and vehicle the displacement in the vertical direction as seen in Fig. 1 will rotate the inner members 15, 15 relative to the outer members 13, 13 and stress the portions of the bodies of rubber-like material 20, 20 between the opposing surfaces 13a and 15a in cylindrical shear and stress the portions between the opposing surfaces 13b and 15b in disc shear. The relative displacement of the seat and vehicle in other directions will stress the bodies of rubber-like material 20, 20 largely in compression. In this manner soft springing is provided for the seat in the vertical direction in which relatively large deflection is afforded by the shear stress; and stiff springing by virtue of compressive stress is provided in the other directions which is desirable to prevent tilt and maintain the stability of the seat.

The modified construction shown in Fig. 3 incorporates two pairs of torsion springs which may be like the springs 12, 12 shown in Fig. 2. Brackets 25, 25 which may be mounted on a supporting structure such as a vehicle frame embrace one pair of torsion springs 12, 12 and are secured thereto by screws 26, 26. A cantilever arm member 27 is bifurcated at one end and has a split collar 28 at the single end portion which is secured to the shaft 16 of the torsion springs 12, 12 and is keyed to the shaft to prevent relative rotation of the shaft 16 and arm member 27.

Another pair of torsion springs 12, 12 is mounted between and on the double portion of the arm member 27 as by screws 29. The shaft 16 of the second pair of torsion springs 12, 12 is secured as by a split collar to another cantilever arm member which supports a seat secured thereto as by screws. It is desirable that this pair of springs 12, 12 have twice the deflection for a given load than the first mentioned pair of springs to attain straight line motion of the seat 32. By using bodies of rubber or other rubber-like material of different moduli or different dimensions or both in the two pairs of springs the desired deflection may be provided.

Upon relative displacement of the vehicle and seat shown in Fig. 3 the bodies of rubber-like material 20, 20 of both pairs of springs 12, 12 will be stressed and provide cushioning of the movement. The relative displacement in the vertical direction as shown in Fig. 3 stresses the bodies of rubber-like material 20, 20 in cylindrical shear and in disc shear which provides a soft springing action for cushioning the movement in the vertical direction. Cushioning of relative displacement in directions other than the vertical is provided by stressing the bodies of rubber-like material largely in compression which limits the tilting of the seat and maintains the stability of the seat. The linkage shown in Fig. 3 is desirable because of the soft springing obtained with two pairs of springs 12, 12 in series and the substantially vertical path of the seat which may be attained. This linkage is also desirable for applications in which it is necessary to mount the suspension on brackets 25 which are under the desired seat position.

A pair of springs 30, 30 is shown in the embodiment of Fig. 4 which may be used in the place of the springs 12, 12 in the seat suspension shown in Figs. 1 and 3. Each spring 30 comprises outer dished members such as concave members 31, 31 and inner members 32, 32 disposed in nested relation with the outer members 31, 31. Bodies of resilient rubber or other rubber-like material 33, 33 are disposed between and bonded by suitable means such as vulcanization to the inner and outer members 32 and 31 to cushion relative movement of the members. The springs 30, 30 may be disposed as shown in Fig. 4 with the concavities of the outer members 31, 31 facing in opposite direction and have an intervening shaft 34 mounted on the outer members by bolts and nuts 35 and 36. A cantilever arm member 37 or other seat structure member may be mounted on the shaft 34 and support the seat which is cushioned in a manner such as is shown in Figs. 1 and 3. The inner members have flanges at their outer extremities which may be secured to a supporting structure such as a vehicle frame by brackets 38, 38 shown in dot-dash lines in Fig. 4.

In operation, the springs 30, 30 shown in Fig. 4 will provide cushioning action similar to that provided by the springs 12, 12 shown in Fig. 2. However, in the springs 30, 30 the outer members 31, 31 will rotate with the seat structure and the inner members 32, 32 will not move relative to the supporting structure. The bodies of rubber-like material 33, 33 will be stressed in cylindrical shear and in disc shear upon relative displacement of the seat and vehicle to cushion the vertical movement while the bodies of rubber-like material will be stressed largely in compression to cushion other movements. In this manner as in the springs 12, 12 shown in Fig. 2 cushioning is provided without sacrificing stability of the seat.

In Fig. 5 further modified springs 40, 40 embodying the invention are shown which may be used in seat suspensions such as are shown in Figs. 1 and 3. The springs 40, 40 comprise annular inner and outer cylindrical members 41 and 42 having radially inwardly extending flanges 43 and 44 respectively which are disposed in a manner such that the opposing surfaces of the inner and outer members extend in a direction axially and radially of the spring structure. Bodies of resilient rubber-like material 45, 45 are interposed between the opposing surfaces of the inner and outer members 41 and 42 and mounted thereon by suitable means such as vulcanization to provide cushioning of movement of the inner members relative to the outer members.

The innermost portions of the flanges 43, 43 of the inner members 41, 41 may be secured to a supporting structure such as a vehicle body 46 which is represented by dot-dash lines in Fig. 5. The outer members 42, 42 are connected together by a collar 47 which is secured to the outer member by nuts and bolts. This collar 47 may be connected to a seat structure such as is shown in Figs. 1 and 3 to provide cushioning of the seat structure upon relative movement of the inner and outer members. The operation of the springs 40, 40 is similar to the operation of the springs heretofore described in that the bodies of rubber-like material 45, 45 are stressed in cylindrical shear and in disc shear to provide soft cushioning movement of the seat structure in a vertical direction and are stressed largely in compression to provide stiff cushioning and stability of the seat suspension when subjected to displacement in other directions.

The arrangement shown in Fig. 6 is like that shown in Fig. 4 and has concave, dished, outer members 48, 48 facing in opposite directions and connected to an intervening seat structure. Inner members 49, 49 are disposed within the concavities of the outer members 48, 48 and bodies of resilient rubber or other rubber-like material are disposed between the members 48 and 49. The outer members 48, 48 are secured directly to the arm of the seat structure and therefore may be in close proximity, one to the other, providing a compact spring assembly.

A further modification of the invention which may be used in seat suspensions such as those shown in Figs. 1 and 3 is shown in Fig. 7. A pair of springs 50, 50 comprises inner and outer annular members 51, 51 and 52, 52 respectively, which have radially inwardly extending flanges 53, 53 and 54, 54, that are disposed in a manner such that the opposing surfaces of the inner and outer members extend in the axial and radial direction of the springs 50, 50. Intervening bodies of rubber-like material 55, 55 are mounted on and between the inner and outer members 51, 51 and 52, 52 to provide cushioning of relative movement of the inner and outer members. The outer members 52, 52 have radially outwardly extending flanges 56, 56 at the outer extremities which may be used for mounting the springs 50, 50 on a supporting structure such as a vehicle shown in dot-dash lines in Fig. 7. The inner members 51, 51 may be connected to a cantilever arm member 57 which may be part of a seat structure supporting a seat such as is shown in Fig. 1. The cantilever arm member 57 is connected to the inner members 51, 51 by bolts 58, 58 which pass through sleeves 59, 59 and the arm member to connect the inner members in a manner such that upon relative movement of the seat and the vehicle the bodies of rubber-like material 55, 55 will be stressed.

In operation the springs 50, 50 function similarly to the springs 12, 12 described in Fig. 2 providing soft cushioning for vertical movements of the seat relative to the vehicle by stressing the intervening bodies of rubber-like material 55, 55 in cylindrical shear and in disc shear. Movement of the seat relative to the vehicle in other directions is cushioned by the intervening bodies of rubber-like material being stressed in compression which provides cushioning with stability of the seat suspension.

Variations may be made without departing from the scope of the invention as it is defined in the following claims.

I claim:

1. A seat suspension comprising a supporting structure, a pair of springs mounted on said supporting structure, said springs being spaced-apart axially and arranged to transmit the total supported load through them, each of said springs comprising inner and outer dished members in nested relation having bodies of resilient rubber-like material therebetween bonded to opposing surfaces of said dished members resisting relative movement of said surfaces and said material by the bonded union, said dished members of each spring being disposed with cavities facing the other spring, a seat-supporting arm structure having a portion disposed at a position intermediate said springs and secured to a dished inner member of each spring in such relation that circumferential movement of said arm structure and connected dished members is cushioned torsionally by said bodies of resilient rubber-like material and longitudinal and lateral movements of the arm structure are cushioned by portions of said bodies in compression, said arm structure being completely cushioned in all directions by portions of said bodies of rubber-like material.

2. A seat suspension comprising a supporting structure, a pair of springs mounted on said supporting structure, said springs being spaced-apart axially and arranged to transmit the total supported load through them, each of said springs comprising inner and outer dished members in nested relation having bodies of resilient rubber-like material therebetween bonded to opposing surfaces of said dished members resisting relative movement of said surfaces and said material by the bonded union, said dished members of each spring being disposed with cavities facing the other spring, a cantilever arm structure having a seat at an end thereof and a portion at the other end disposed intermediate said springs and secured to an outer dished member of each spring in such relation that circumferential movement of said arm structure and connected dish members is cushioned torsionally by said bodies of resilient rubber-like material and longitudinal and lateral movements of the arm structure are cushioned by portions of said bodies in compression, said arm structure being completely cushioned in all directions by portions of said bodies of rubber-like material.

3. A seat suspension comprising a supporting structure, springs thereon spaced-apart axially and arranged to transmit the total supported load through them, each of said springs comprising dished members in nested relation having bodies of resilient rubber-like material therebetween bonded to opposing surfaces of said dished members resisting relative movement of said surfaces and said material by the bonded union, said dished members of each spring being disposed with cavities facing the other spring, a seat structure including a cantilever arm, a portion of which arm is disposed at a position intermediate said springs and secured to a corresponding member of each spring such that angular movement of said seat structure is cushioned by said bodies of resilient rubber-like material in cylindrical and disc shear and longitudinal and lateral movements of the arm are cushioned by compression of portions of said bodies, and said arm being completely cushioned in all directions by said bodies of resilient rubber-like material.

HERBERT H. FINK.

References Cited in the file of this patent

UNITED STATES PATENTS

| Number | Name | Date |
|---|---|---|
| 1,911,585 | Saurer | May 30, 1933 |
| 2,090,223 | Ney | Aug. 17, 1937 |
| 2,460,596 | Roche | Feb. 1, 1949 |

FOREIGN PATENTS

| Number | Country | Date |
|---|---|---|
| 42,301 | Netherlands | Jan. 15, 1938 |